UNITED STATES PATENT OFFICE.

MELCHIOR BÖNIGER, OF BASEL, SWITZERLAND, ASSIGNOR TO THE CORPORATION OF CHEMICAL WORKS, FORMERLY SANDOZ, OF BASEL, SWITZERLAND.

YELLOW AZO DYE AND PROCESS OF MAKING SAME.

No. 901,675.      Specification of Letters Patent.      Patented Oct. 20, 1908.

Application filed June 11, 1908. Serial No. 437,964.

*To all whom it may concern:*

Be it known that I, MELCHIOR BÖNIGER, doctor of philosophy, chemist, a citizen of the Swiss Republic, and resident of Basel, Switzerland, with the post-office address Fabrikstrasse 116, have invented new and useful Improvements in new Yellow Azo Dyes and Processes of Producing the Same, of which the following is a specification.

This invention relates to the manufacture of yellow azo dyes by combining pyrazolone compounds of the general formula

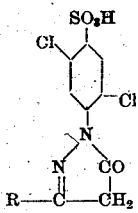

wherein R stands for $CH_3$ or $COOH$, with the diazo compounds of anilincarboxylic acids, anilinsulfonic acids, their homologues and halogen derivatives. The coloring matters so obtained dye wool from an acid bath bright yellow shades, which are distinguished by their excellent fastness to light. On account of this property they are also particularly suitable for the preparation of lakes.

The new coloring matters which I desire to claim generally are characterized by the following properties: They form yellow powders, easily soluble in water with yellow color, which is not altered by the addition of acids. Their neutral watery solution boiled with zinc dust is decolorized, the solution becoming in contact with the air rapidly red-violet. In strong sulfuric acid they dissolve with a greenish-yellow coloration.

The method of production is illustrated by the following examples:

Example I. Add to the solution of: 80 kg. 1-orthometadichlorparasulfophenyl-5-pyrazolon-3-carboxylic acid and 40 kg. calcined sodium carbonate in about 600 liters of water at a temperature not exceeding 10° C. the diazosulfonic acid obtained in the well known manner from 34.6 kg. metanilic acid. After stirring for an hour precipitate the dyestuff from the intense greenish-yellow solution by addition of common salt. When filtered and dried it forms a clear yellow powder; it dyes wool from an acidulated bath in greenish yellow tints exceedingly fast to light.

Example II. Introduce into a solution of 73 kg. 1-orthometadichlorparasulfophenyl-3-methyl-5-pyrazolon and 40 kg. calcined sodium carbonate in about 600 liters of water at 10° C. the 4-diazo-1.3-xylol-5-sulfonic-acid obtained from 40.2 kg. metaxylidinesulfonic acid. Stir for an hour, then heat to the boil and precipitate the dyestuff by addition of common salt and a mineral acid until weakly acid reaction is reached. It dyes wool from an acidulated bath in brilliant yellow shades of extraordinary fastness against the action of light.

In a similar manner yellow coloring matters can be obtained in using the diazo compounds of the different anilincarboxylic acids, analinsulfonic acids, their homologues and halogen derivatives for the combination with the pyrazolone compounds hereinbefore mentioned.

Now what I claim and desire to secure by Letters Patent is the following:

1. The herein described process for the manufacture of yellow azo dyes by combining in an alkaline solution a pyrazolone compound of the formula

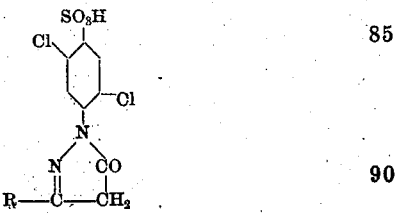

wherein R stands for $CH_3$ or $COOH$, with the diazo compounds of anilincarboxylic acids, anilinsulfonic acids, their homologues and halogen derivatives.

2. The yellow coloring matters obtained as hereinbefore described, being in dry state yellow powders, easily soluble in water with yellow color, which is not altered by the addition of acids, dissolving in concentrated sulfuric acid with a greenish-yellow coloration, their neutral watery solution boiled with zinc dust being decolorized, the solution thereby obtained becoming in contact with the air rapidly reddish violet.

In testimony, that I claim the foregoing as my invention, I have signed my name in presence of two witnesses, this 25th day of May 1908.

MELCHIOR BÖNIGER.

Witnesses:
ARNOLD STEINER,
GEO. H. WAGNER.